Jan. 12, 1954

C. J. YOUNG 2,666,094

FACSIMILE SCANNER HAVING ADJUSTABLE
LENGTH OF SCANNING LINE

Filed June 25, 1951

INVENTOR
Charles J. Young
BY
George T. Craig
ATTORNEY.

Jan. 12, 1954
C. J. YOUNG
2,666,094
FACSIMILE SCANNER HAVING ADJUSTABLE
LENGTH OF SCANNING LINE
Filed June 25, 1951
2 Sheets-Sheet 2
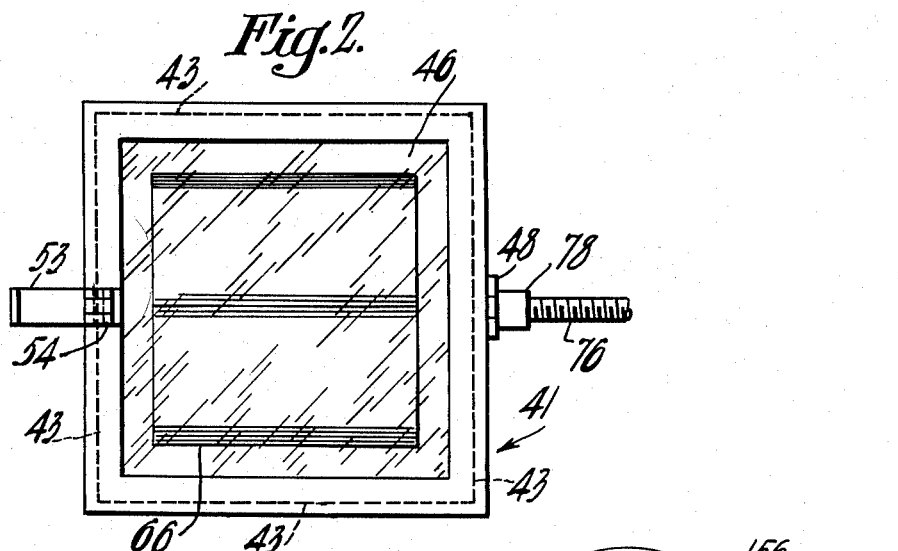
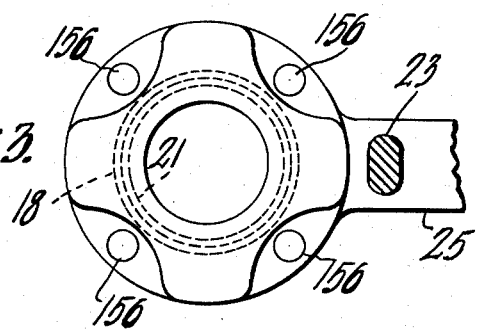
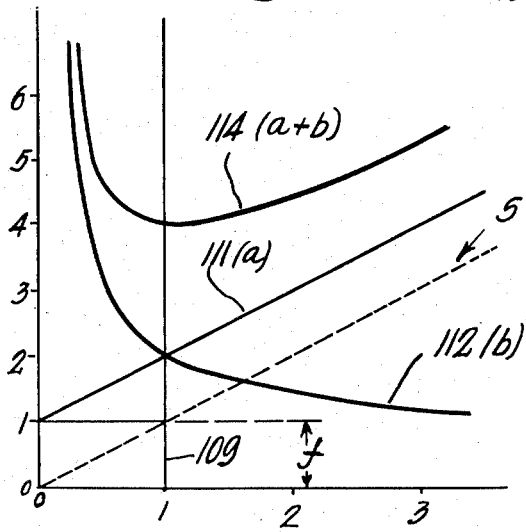
INVENTOR
Charles J. Young
BY
George J. Craig
ATTORNEY Patented Jan. 12, 1954

2,666,094

UNITED STATES PATENT OFFICE 2,666,094

FACSIMILE SCANNER HAVING ADJUSTABLE LENGTH OF SCANNING LINE

Charles J. Young, Princeton, N. J., assignor to Radio Corporation of America, a corporation of Delaware Application June 25, 1951, Serial No. 233,464

9 Claims. (Cl. 178—7.1)

The present invention relates to facsimile scanners of the type employing a moving spot of light to effect one component of scanning; and, more particularly, but not necessarily exclusively, to a novel flying spot scanner in which the length of the scanning line is continuously and conveniently adjustable in a manner to correlate the position of the scanning spot light source, the position of an optical arrangement for imaging the light source on the subject surface, and the movement of a holder for the scanning subject which provides the second component of scanning movement.

In accordance with the invention, a facsimile scanner is provided employing a moving spot of light for obtaining one coordinate of scanning. A cathode ray tube is shown in the illustrative example in which the beam is repeatedly swept across the tube phosphor along a single line to produce a moving spot of light. The light spot from one end of its travel to the other is imaged by a lens onto the subject copy which is to be scanned. The subject copy is movable with respect to the cathode ray tube transversely of the motion of the light spot to provide the second component of scanning. The position of the lens with respect to the subject copy is adjustable so as to alter the magnification on the subject copy of the length of line resulting from the movement of the light spot. Means are also provided for concurrently altering the position of the light source, such as the cathode ray tube, with respect to the lens as the lens is moved. The rate of scanning movement of the subject copy is adjustable so that as the magnification is decreased to shorten the scanning line, the rate of travel of the subject copy producing the scanning line component is decreased. It will thus be seen that the invention provides a convenient arrangement for furnishing signals to a facsimile recorder of any known type in such a way that the recorder will produce a record showing enlarged or diminished copy in facsimile of the transmitted subject copy. The invention particularly resides in correlating the length of scanning line produced on the subject copy, the focus of the scanning light spot on the subject copy, and the speed of linear feed of the subject copy which produces the second component of scanning.

The remote duplication of reference material is one field of use for the present invention. In cases where facsimile is to be used for the remote duplication of books, it is desirable to have the length of scanning lines adjustable from the width of the full page of a book, for example, down to the width of a single column on the page. The scanner of this invention, used in combination with a known recorder, such as an electrolytic recorder, having a fixed length of scanning line of, say, 8½" provides a very satisfactory means for sending reference material from a central library to outlying branches. When the subject copy is in large print, the scanner embodying this invention is adjusted for an 8½" line and full-size copy comes out of the recorder. When the original subject copy is set in columns of fine print, the scanning line may be reduced to, say, 4½" in which case the recorder prints a double size image which is easy to read. The number of lines per unit of scanning line length is increased automatically by the combined means of this invention and in the example just set forth, the number of scanning lines is doubled.

It is within the scope of the present invention to modulate the beam of the cathode ray tube, or otherwise modulate the light spot in accordance with received information, and to position a record receiving sheet on the copy holder. The scanner disclosed herein will then serve as a recording scanner.

The primary object of the present invention is to provide a facsimile scanner in a form such that the length of the scanning line is continuously and conveniently adjustable.

Another object of the invention is to provide a facsimile scanner in which the enlargement ratio, scanning spot focus, and linear speed of the subject copy are interconnected through a single control means.

Other objects and advantages of the invention will, of course, become apparent and immediately suggest themselves to those skilled in the art to which the invention is directed from a reading of the following specification in connection with the accompanying drawing in which:

Fig. 2 is a fragmentary view in plane of the movable copy holder showing a book in position thereon;

Fig. 3 is a fragmentary section of the apparatus of Fig. 1 taken approximately on line 3—3 as viewed in the direction of the arrows; and Fig. 4 shows a series of curves used to illustrate the operation of apparatus embodying the invention.

Figure 1:
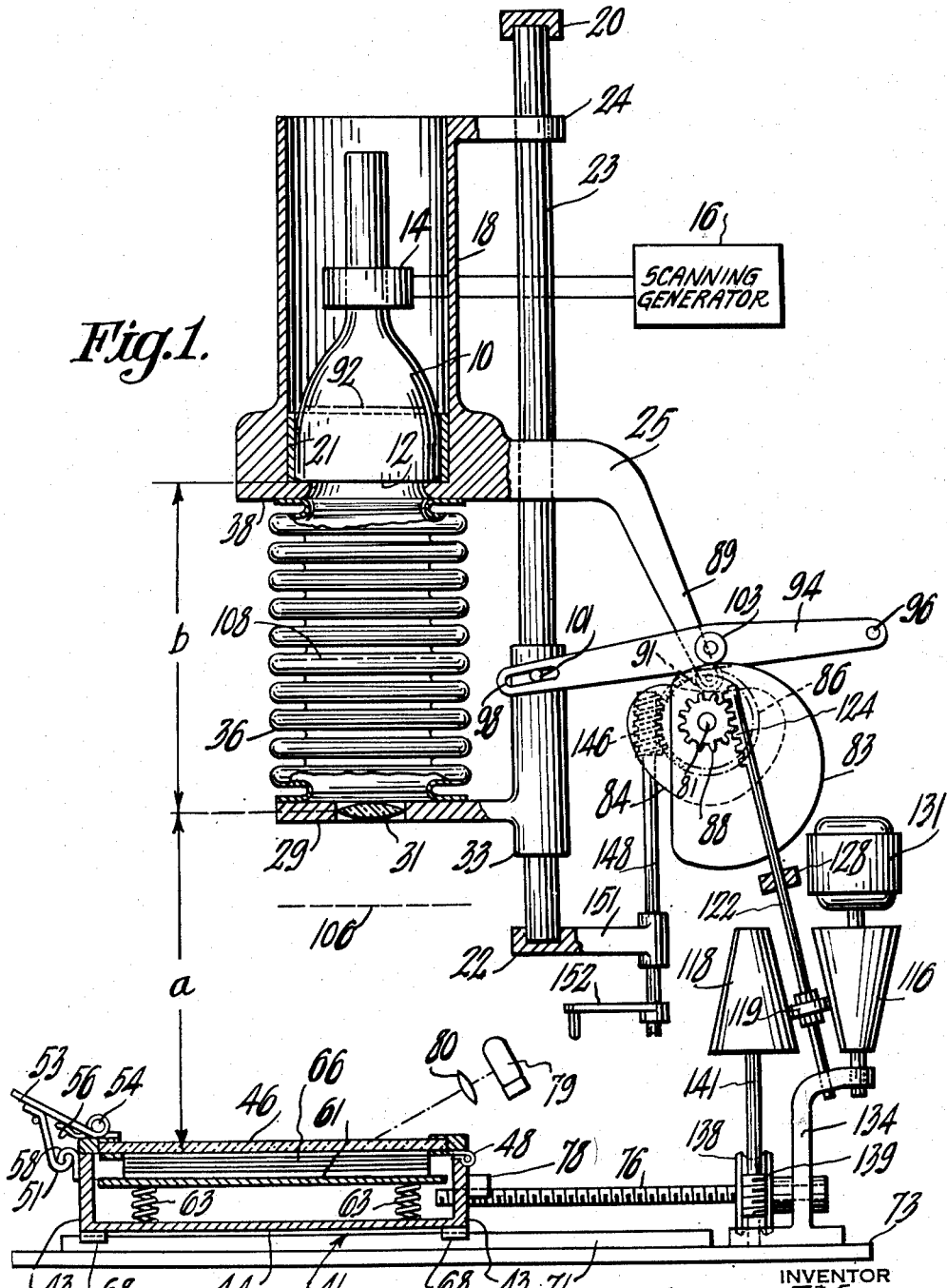
Fig. 1 is a view in side elevation of a scanner embodying the present invention with parts omitted for the sake of convenience of disclosure.

Referring to the drawing, reference numeral 10 designates a cathode ray tube having the usual phosphor coating on the inside of the tube end 12. A cathode ray beam is generated and directed by the usual means (not shown) against the phosphor thereby to produce a spot of light of suitable dimensions at the point of impingement on the beam of the phosphor. A more or less conventional deflection yoke is indicated by reference character 14 which is supplied with a sawtooth of current with a scanning generator 16. The beam is thereby caused to trace a line on the phosphor at uniform velocity followed by a rapid retrace.

The cathode ray tube 10 is mounted in a holder 18 generally of cylindrical shape and it is or may be maintained in the holder by means of a ring member 21 in a manner similar to that shown by Fig. 5 of U. S. Patent No. 2,549,585, granted to D. W. Epstein on April 17, 1951. It will be understood, however, that the tube 10 may be supported by any suitable device which will leave its face 12 exposed as indicated on Fig. 1 of the drawing. The holder 18 is slidably supported on a bar or rod 23 by means of suitably shaped and apertured brackets 24 and 25. The rod 23 is vertically disposed in the illustrative example. The rod 23 is mounted on any suitable stationary parts or supports 20 and 22. As indicated in Fig. 3, the rod 23 may be flattened in the cross-section thereby serving to prevent swinging movement of the holder 18. As an alternative, a plurality of rods 23 may be used and the brackets 24 and 25 may be duplicated or each one may be large enough to have provision for slidably receiving more than one rod 23.

A lens holder 29 is apertured to receive a lens 31, the optical axis of which coincides or substantially coincides with the geometrical axis of the tube 10. The lens holder 29 is integral with or extends from a sleeve member 33 which is slidable on the rod 23. A light excluding shield in the form of a bellows 36 extends from the lower face 38 of the tube holder 18 to the top surface of the lens holder 29 where it surrounds the lens.

The lens 31 serves to image a light spot produced on the face 12 of the cathode ray tube onto a piece of subject copy held by a copy holder indicated generally by reference character 41. The copy holder may be of any suitable kind but as shown in Figs. 1 and 2, by way of example, it comprises a frame member having sides 43 and a bottom 44. A transparent cover 46 in a suitable frame or holder is hinged as indicated at 48 to one of the sides 43 and is provided with any suitable latch or catch 51 to hold it in the closed position. As indicated on Fig. 1 of the drawing, a handle member 53 is hinged at 54 to the frame surrounding the transparent member 46. This handle member is pressed upwardly by a spring 56 so that the catch 51, which is pivoted on the handle 53, will engage with a hook member 58. It will be understood that any suitable catch may be employed for the purpose. Reference character 61 indicates a flat plate pressed upwardly by springs 63 against the transparent cover 46. When the transparent cover 46 is raised, a book 66, shown by way of example, or any other copy may be laid on the plate 61 and when the transparent cover member 46 is closed, the exposed pages of the book will be in the proper plane for traversal by the spot of light projected from the tube face 12.

The entire copy holder 41 is mounted on shoes 68 which are slidably received on a trackway 71. The trackway 71 is integral with or secured to a base member 73. A lead screw 76 engaged by a half-nut 78 on the copy holder 41 serves to move the latter as the lead screw is turned. A phototube 79 is suitably supported and positioned to gather light reflected from the subject. Any known means may be employed to obtain image signals from the output of the phototube. A lens 80 is shown, however, an electron multiplier phototube may be used without the lens to gather light reflected from the subject copy as it is scanned by the moving light spot. During scanning, the subject copy and pick-up system for the light reflected therefrom are protected from room light by an enclosure, not shown.

The tube holder 18, the lens holder 29 and the driving mechanism for the lead screw 76 are all controllable by a single control device in a manner now to be described. A shaft 81 is rotatably mounted in any suitable manner (not shown) and has cams 83 and 84 secured thereon. This shaft also carries a worm wheel 86 and a pinion 88. The bracket 25 has an extension 89 carrying a cam follower in the form of a roller 91 which rests on the periphery of the cam 84. As the shaft 81 is rotated, the tube holder 18 is raised or lowered. In the angular position in Fig. 1 of the shaft 81 and, hence, the cam 84, the holder 18 is shown as being located in the lowermost position and the tube face 12 can travel between the line designated 92 and the location in which it is shown.

An arm 94 is pivoted to any suitable fixed support as indicated at 96 and is provided with a slot 98. A pin 101 on the sleeve 33 is received in the slot 98. A cam follower in the form of a roller 103 is mounted on the arm 94. The roller 103 rests on the periphery of the cam 83. As the shaft 81 is rotated, the lens holder 29 is raised and lowered between limits indicated by lines 106 and 108. The lens holder 29 is shown in a mean position which is indicated on Fig. 4 of the drawing by the line 109. The curve 111 of Fig. 4 approximately represents the change in the distance of the lens holder 29 from the surface of the subject copy as magnification is changed. The curve 112 of Fig. 4 approximately represents the distance which must be maintained between the lens holder 29 and the tube face 12. The curves 111 and 112 are added to give the curve 114 which represents the motion of the tube face which is imparted by the cam 84. The magnification is equal to the distance between the subject copy and the lens holder divided by the distance between the lens holder and the tube face 12. This latter is a well-known optical relationship in photographic enlargement work, and is arrived at in the following manner:

$$\frac{1}{a}+\frac{1}{b}=\frac{1}{f} \text{ and } X=\frac{a}{b}$$

where $a$ = distance from copy to lens
$b$ = distance from tube to lens
$f$ = focal length of lens
$X$ = magnification From these two relations:

$$a = fX + f$$

$$b = f + \frac{f}{x}$$

$$a + b = 2f + fX + \frac{f}{X}$$

The least magnification giving the shortest scanning line on the subject copy in the illustrative example requires that the lens holder be located on the line 106. To accomplish this, the shaft 81 will be turned in a clock-wise direction until the flat surface on the cam 83 is substantially horizontal. The full range of movement of the shaft 81 from this last named position is counter clock-wise for 270°.

The lead screw 76 is shown as being driven through a speed reduction device of well-known form comprising conical friction members 116 and 118. These are coupled by a friction roller 119 rotatably carried by a rod 122. Rack teeth 124 are formed along the rod adjacent its upper end for engagement with the pinion 88. Reference character 128 represents a bracket member secured to any stationary part (not shown) of the scanner and the rod 122 may be square in cross-sections where it passes through this bracket. The roller 119 is driven by a motor 131 of any suitable type which is capable of operating it at a substantially constant speed. The base 73 is provided with a bracket 134 which serves as a guide for the rod 122 and which may serve as a bearing for the shaft of the cone member 116. The lead screw 76 may also have bearing support in the bracket 134. A worm wheel 138 is in mesh with a worm 139 carried by the shaft 141 of the friction cone member 118. In the arrangement shown, it will be seen that as magnification is decreased and the length of the scanning line on the subject copy is shortened, the speed of rotation of the shaft 76 will decrease.

Rotation of the shaft 81 controls the three functions pointed out above simultaneously and to provide for convenience of rotation of the shaft, a worm 146 meshes with the previously-mentioned worm wheel 86. The worm 146 is carried by a shaft 148 suitably journalled in an extension 151 extending from the stationary support 22. A crank or hand wheel 152 provides a convenient means for turning the shaft 148. It will be understood that the shaft 81 may, within the scope of the invention, be operated by power driven means (not shown).

In order to indicate the extent of the scanned area at any enlargement, four small lamps 156 of any suitable type may be mounted in the holder 18 with their filaments generally in the plane of the tube face 12. Light from these lamps will be projected upon the copy holder or the subject copy during the loading period to insure correct placement of the subject copy. They are turned off during scanning.

What is claimed is:

1. A facsimile scanner for scanning subject copy comprising means having an exposed surface traversed by a scanning light spot, means to support a piece of subject copy to be scanned by said light spot, optical means for imaging said light spot on subject copy supported by said copy supporting means, variable speed means for continuously feeding said copy supporting means in a direction transverse to the movement of said light spot, means to provide for movement of said surface toward or from said copy supporting means, means to support said optical means for movement thereof toward or from said copy supporting means, and means to correlate movement of said surface, said optical means, and the speed of operation of said feed means for said copy supporting means, said variable speed means being continuously variable in accordance with movement of said surface and said optical means.

2. A facsimile scanner for scanning subject copy comprising a cathode ray tube having an exposed face, means to cause a scanning light spot to traverse said face, means to support a piece of subject copy to be scanned by said light spot, optical means for imaging said light spot on subject copy supported by said copy supporting means, variable speed means for feeding said copy supporting means continuously in a direction transverse to the movement of said light spot, means to provide for movement of said cathode ray tube toward or from said copy supporting means, means to support said optical means for movement thereof toward or from said copy supporting means, and means to correlate movement of said cathode ray tube, said optical means, and the speed of operation of said feed means for said copy supporting means.

3. A facsimile scanner for scanning subject copy comprising means having an exposed surface traversed by a scanning light spot, means to support a piece of subject copy to be scanned by said light spot, optical means for imaging said light spot on subject copy supported by said copy supporting means, variable speed means for feeding said copy supporting means with continuous motion in a direction transverse to the movement of said light spot, cam means to provide for movement of said surface toward or from said copy supporting means, means to support said optical means for movement thereof toward or from said copy supporting means, cam means to provide for movement of said optical means, and means to correlate movement of said surface, said optical means, and the speed of operation of said feed means for said copy supporting means, whereby said speed is adapted to be maintained substantially proportional to the magnification of said optical means.

4. A facsimile scanner for scanning subject copy comprising means having an exposed surface traversed by a scanning light spot, means to support a piece of subject copy to be scanned by said light spot, optical means for imaging said light spot on subject copy supported by said copy supporting means, variable speed means to feed said copy supporting means in a direction transverse to the movement of said light spot, cam means to provide for movement of said surface toward or from said copy supporting means, means to support said optical means for movement thereof toward or from said copy supporting means, a second cam means to provide for movement of said optical means, a revoluble shaft upon which the cams of said cam means are carried, means controlled by said shaft upon rotation thereof for altering the speed of operation of said variable speed means, and means to rotate said shaft.

5. A facsimile scanner for scanning subject copy comprising a cathode ray tube having an exposed face, means to cause a scanning light spot to traverse said face, a bracket for supporting said tube, means to support a piece of subject copy to be scanned by said light spot, a lens for imaging said light spot on subject copy supported by said copy supporting means, variable speed means to feed said copy supporting means in a direction transverse to the movement of said light spot, a cam to provide for movement of said tube supporting bracket toward or from said copy supporting means, a bracket for supporting said lens for movement thereof toward or from said copy supporting means, a second cam to provide for movement of said lens supporting bracket, a revoluble shaft upon which said cams are carried, means controlled by said shaft upon rotation thereof for altering the speed of operation of said variable speed means, and means to rotate said shaft.

6. A facsimile scanner having provision for varying the size of copy reproduced by a recorder coupled to said scanner, said scanner having means to produce a light spot movable substantially linearly along a path of predetermined length in a direction to traverse a piece of subject copy, a copy holder for supporting a piece of subject copy in scanning position, means to project said moving light spot into a piece of subject copy on said copy holder, means to vary the length of the path transversed by said projected light spot on a piece of subject copy, and means in addition to said produced light spot to indicate the length of the path of said projected light spot on a piece of subject copy.

7. A facsimile scanner having provision for varying the size of copy reproduced by a recorder coupled to said scanner, said scanner comprising a cathode ray tube to produce a light spot movable substantially linearly along a path of predetermined length in a direction to traverse a piece of subject copy, a movable copy holder for supporting a piece of subject copy in scanning position, means to project said light spot on a piece of subject copy on said copy holder, means to vary the length of the path transversed by said projected light spot on a piece of subject copy, and spaced independent light sources adjacent said cathode ray tube to indicate the length of the path of said projected light spot on a piece of subject copy.

8. A facsimile scanner having provision for varying the size of copy reproduced by a recorder coupled to said scanner, said scanner comprising a cathode ray tube to produce a light spot movable substantially linearly along a path of predetermined length in a direction to traverse a piece of subject copy, a movable copy holder for supporting a piece of subject copy in scanning position, means to move said copy holder transversely of the path of movement of said light spot, means to project said light spot on a piece of subject copy on said copy holder, means to vary the length of the path transversed by said projected light spot on a piece of subject copy, and four light sources adjacent said cathode ray tube to indicate substantially the area to be scanned by said projected light spot on a piece of subject copy.

9. A facsimile scanner having provision for varying the size of copy reproduced by a recorder coupled to said scanner, said scanner comprising a cathode ray tube to produce a light spot movable substantially linearly along a path of predetermined length in a direction to traverse a piece of subject copy, a movable support for said cathode ray tube, a movable copy holder for supporting a piece of subject copy in scanning position, means to project said light spot on a piece of subject copy on said copy holder, means to vary the length of the path transversed by said projected light spot on a piece of subject copy, and spaced independent light sources carried by said movable support for said cathode ray tube to indicate the length of the path of said projected light spot on a piece of subject copy.

CHARLES J. YOUNG.

References Cited in the file of this patent

UNITED STATES PATENTS

| Number | Name | Date |
| --- | --- | --- |
| 2,262,584 | Herriott | Nov. 11, 1941 |
| 2,567,307 | Wise et al. | Sept. 11, 1951 |